(12) United States Patent
Morishima (10) Patent No.: US 11,054,586 B2
(45) Date of Patent: Jul. 6, 2021

(54) OPTICAL CONNECTOR AND OPTICAL CONNECTION STRUCTURE

(71) Applicant: SUMITOMO ELECTRIC INDUSTRIES, LTD., Osaka (JP)

(72) Inventor: Tetsu Morishima, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/893,143

(22) Filed: Jun. 4, 2020

(65) Prior Publication Data

US 2020/0301081 A1 Sep. 24, 2020

Related U.S. Application Data

(63) Continuation of application No. PCT/JP2018/045389, filed on Dec. 11, 2018.

(30) Foreign Application Priority Data

Dec. 26, 2017 (JP) .............................. JP2017-248782

(51) Int. Cl.
  *G02B 6/38* (2006.01)
(52) U.S. Cl.
  CPC ......... *G02B 6/3869* (2013.01); *G02B 6/3831* (2013.01); *G02B 6/3851* (2013.01);
  (Continued)
(58) Field of Classification Search
  None
  See application file for complete search history.

(56) References Cited

U.S. PATENT DOCUMENTS

| 4,964,685 A | 10/1990 | Savitsky et al. |
| 5,394,497 A | 2/1995 | Erdman et al. |

(Continued)

FOREIGN PATENT DOCUMENTS

| JP | H08-106028 A | 4/1996 |
| JP | H10-090558 A | 4/1998 |

(Continued)

OTHER PUBLICATIONS

Nagase et al.; MU-type multicore fiber connector; Proceedings of hte 61st IWCS Conference; 2012; pp. 823-827.

(Continued)

*Primary Examiner* — Jerry Rahll
(74) *Attorney, Agent, or Firm* — Oliff PLC (57) ABSTRACT

An optical connector that requires fewer components and also has a simpler structure includes an optical fiber including a glass fiber and a resin coating surrounding the glass fiber; a ferrule having a flange outside the ferrule and a through-hole inside the ferrule, the ferrule holding, in the through-hole, a portion of the glass fiber exposed from the resin coating at an end of the optical fiber; a plug frame accommodating the ferrule; and an elastic member abutting the flange and biasing the ferrule. The flange has a flat surface on an outer periphery thereof, and the plug frame has a guide surface configured to unrotatably align the ferrule biased by the elastic member in contact with the flat surface of the flange. When the ferrule is moved in the direction opposite to the biasing direction, the flat surface is separated from the guide surface to bring the ferrule into a floating state relative to the plug frame.

9 Claims, 8 Drawing Sheets

(52) U.S. Cl.
CPC .......... *G02B 6/3871* (2013.01); *G02B 6/3854* (2013.01); *G02B 6/3877* (2013.01)

(56) References Cited

U.S. PATENT DOCUMENTS

| | | |
|---|---|---|
| 5,724,466 A | 3/1998 | Rickenbach et al. |
| 6,287,018 B1 | 9/2001 | Andrews et al. |
| 6,318,905 B1 | 11/2001 | Valencia et al. |
| 7,178,988 B2 | 2/2007 | Terakura |
| 7,281,859 B2 | 10/2007 | Mudd et al. |
| 8,974,124 B2 | 3/2015 | Chang |
| 9,182,567 B2 | 11/2015 | Mullaney |
| 9,250,395 B2 | 2/2016 | Nielson |
| 9,360,637 B2 | 6/2016 | Taira et al. |
| 10,042,128 B2 | 8/2018 | Mullert |
| 2002/0085815 A1 | 7/2002 | Shinagawa et al. |
| 2004/0264877 A1 | 12/2004 | Makhlin et al. |
| 2006/0257075 A1 | 11/2006 | Terakura |
| 2011/0229085 A1* | 9/2011 | Bradley ............... G02B 6/3843 385/78 |
| 2012/0243832 A1 | 9/2012 | Tamekuni et al. |
| 2014/0114198 A1 | 4/2014 | Sawada et al. |
| 2015/0247977 A1 | 9/2015 | Shimakawa |
| 2015/0253517 A1 | 9/2015 | Taira et al. |
| 2016/0139344 A1 | 5/2016 | de los Santos Campos et al. |
| 2019/0086615 A1 | 3/2019 | Rosson |
| 2019/0101705 A1 | 4/2019 | Morishima et al. |

FOREIGN PATENT DOCUMENTS

| | | |
|---|---|---|
| JP | 2001-56420 A | 2/2001 |
| JP | 2015-187697 A | 10/2015 |
| WO | 2012/157276 A1 | 11/2012 |

OTHER PUBLICATIONS

Sakaime et al.; "MU-Type Mulyi-core fibere connector;" IEICE Communications Society Conference; 2012; B-13-9.

* cited by examiner

OPTICAL CONNECTOR AND OPTICAL CONNECTION STRUCTURE

CROSS-REFERENCE TO RELATED APPLICATIONS

The present application is a continuation application of International Application No. PCT/JP2018/045389, filed on Dec. 11, 2018, which claims priority to Japanese Patent Application No. 2017-248782, filed on Dec. 26, 2017. The contents of these applications are incorporated herein by reference in their entirety.

BACKGROUND OF THE INVENTION

Field of the Invention

The present disclosure relates to optical connectors and optical connection structures, and specifically to an optical connector and an optical connection structure that include a ferrule with a flange, an elastic member biasing the ferrule, and a plug frame accommodating the ferrule and the elastic member.

Description of the Related Art

To support two-way communication and high-volume communication as well as high-speed communication and increased volumes of information due to the widespread use of information communications such as the Internet, the construction of optical networks is progressing. Optical connectors are used to connect network devices to each other in data centers and to connect optical fibers to home side receiving equipment, for example, in Fiber To The Home (FTTH). An optical connector includes a ferrule holding an optical fiber and a plug frame accommodating the ferrule. A flange is disposed outside the ferrule. The flange is biased in the optical axis direction of the optical fiber. The optical connector is coupled to another optical connector with a sleeve therebetween, and the cores of the optical fibers are optically connected together.

The optical connection between the cores needs to be maintained when an external force is applied to the plug frame. Accordingly, Sakaime et al., "MU-Type Multicore Fiber Connector", IEICE Communications Society Conference, B-13-9, September 2012 (Non-Patent Literature 1) discloses a connector that allows a ferrule and a flange to float relative to a plug frame (plug housing) so that an external force applied to the plug frame is not transmitted to the ferrule or the flange.

The optical connector disclosed in Non-Patent Literature 1 has an Oldham coupling mechanism between the ferrule and the plug frame. The ferrule is movable relative to the coupling component between the flange and the plug frame in one direction (horizontal direction) perpendicular to the central axis of the ferrule. The coupling component is movable relative to the plug frame in a direction (vertical direction) perpendicular to the central axis of the ferrule and to the one direction. The flange of this optical connector is divided into a plurality of segments movable in the vertical and horizontal directions; therefore, the optical connector requires an increased number of components and also has a complicated structure, which makes it difficult to reduce the manufacturing cost of the optical connector. In addition, the optical connector disclosed in Non-Patent Literature 1 allows the ferrule to float within the plug frame so that the ferrule is movable only in a direction perpendicular to the central axis of the ferrule, and there is no disclosure of allowing the ferrule to float so that the ferrule is also movable in the direction of the central axis of the ferrule and is also rotatable.

BRIEF SUMMARY OF THE INVENTION

An optical connector according to the present disclosure includes an optical fiber including a glass fiber and a resin coating surrounding the glass fiber; a ferrule having a flange outside the ferrule and a through-hole inside the ferrule, the ferrule holding, in the through-hole, a portion of the glass fiber exposed from the resin coating at an end of the optical fiber; a plug frame accommodating the ferrule; and an elastic member abutting the flange and biasing the ferrule forward in a direction of an axis of the through-hole. The flange has a flat surface on an outer periphery thereof, and the plug frame has a guide surface configured to unrotatably align the ferrule biased by the elastic member at a predetermined position in contact with the flat surface of the flange. When the ferrule is moved rearward in the direction of the axis of the through-hole relative to the predetermined position, the flat surface is separated from the guide surface to bring the ferrule into a floating state relative to the plug frame.

Here, "forward in the direction of the axis of the through-hole" refers to the direction in which the end of the optical fiber held by the ferrule points, i.e., the direction in which the end, held by the ferrule, of the optical fiber in the plug frame points. In addition, "rearward in the direction of the axis of the through-hole" refers to the opposite direction.

An optical connection structure according to the present disclosure includes the optical connector of the present disclosure and a connection target coupled to the optical connector of the present disclosure with a sleeve therebetween. The two optical fibers are optically connected together. The flat surface is separated from the guide surface when the ferrule is inserted into the sleeve and is moved rearward in the direction of the axis of the through-hole relative to the predetermined position of the plug frame.

DETAILED DESCRIPTION OF THE INVENTION

Embodiments of optical connectors and optical connection structures according to the present disclosure will hereinafter be described with reference to the attached drawings. In the following, an LC connector is described as an example of an optical connector.

Figure 1:
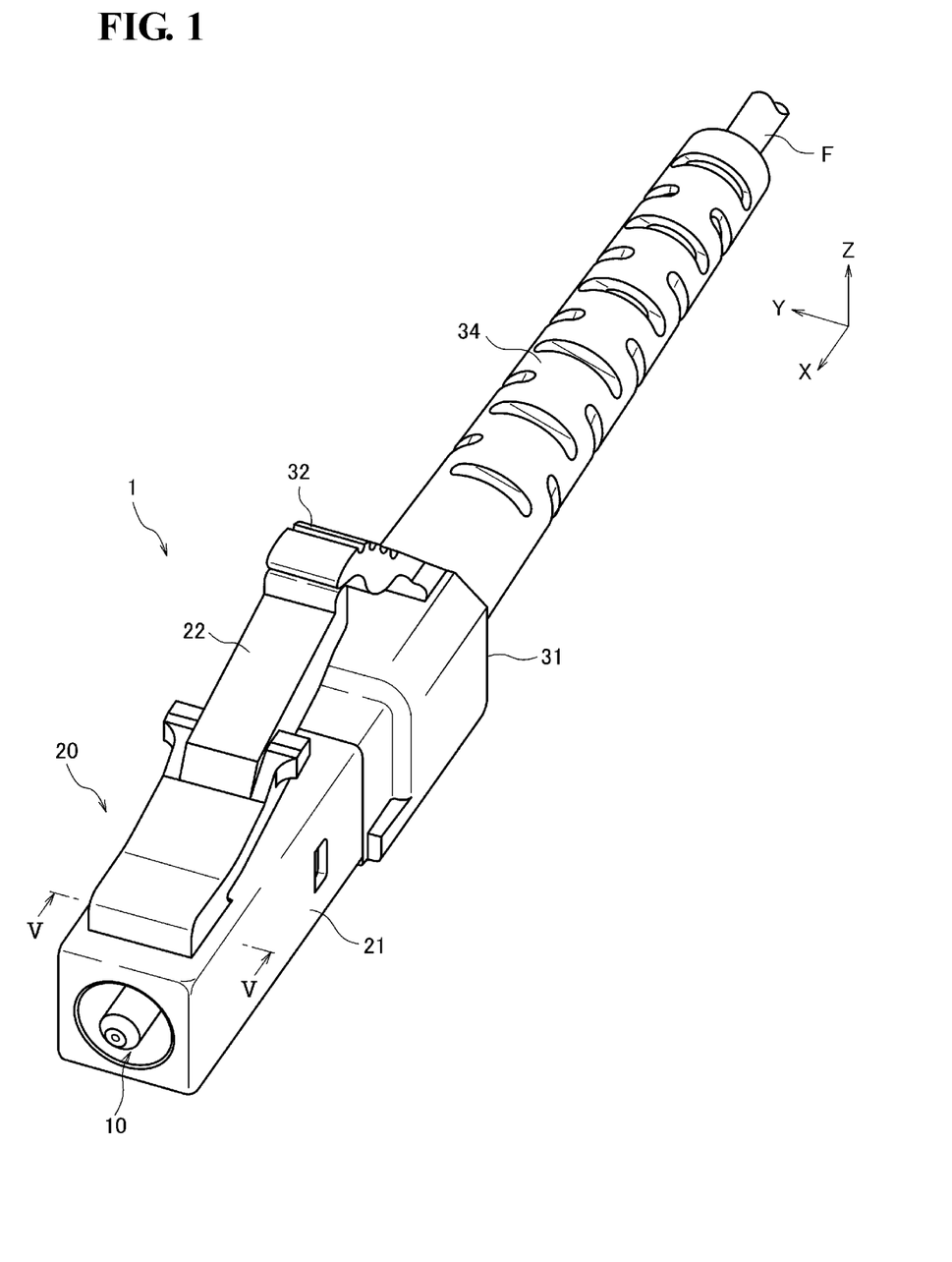
FIG. 1 is an external perspective view of an optical connector according to one embodiment of the present disclosure.

FIG. 1 is an external perspective view of an optical connector 1 according to one embodiment of the present disclosure. The optical connector 1 includes a plug frame 20 accommodating a ferrule 10. A boot 34 for protecting an optical fiber F is disposed at the rear end of the plug frame 20.

Figure 2:
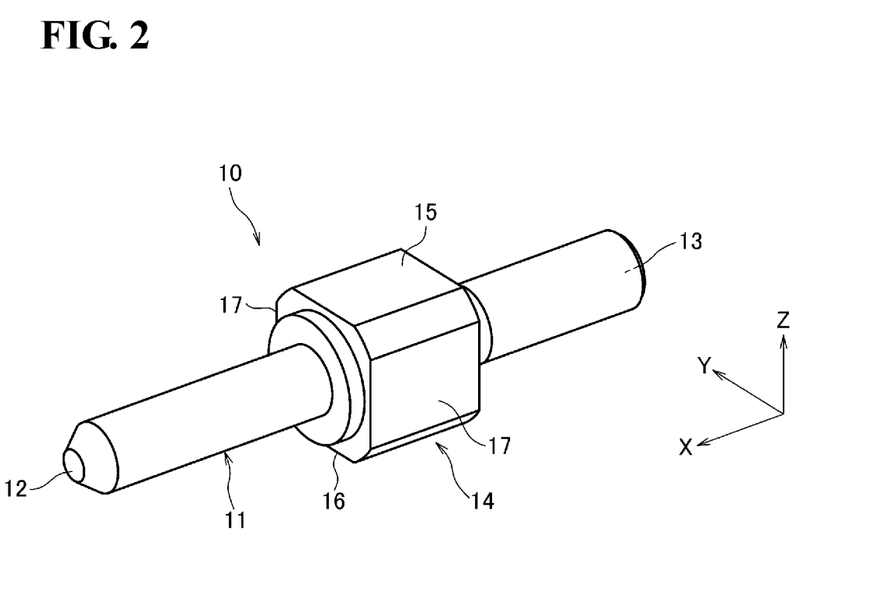
FIG. 2 is a perspective view of a ferrule forming the optical connector in FIG. 1.

FIG. 2 is a perspective view of the ferrule 10. The ferrule 10 includes a ferrule body 11. The ferrule body 11 is formed of zirconia, which allows for less reflection at the end face of the ferrule than metal ferrules. The ferrule body 11 has a cylindrical shape with a through-hole inside the ferrule body 11 and holds, in the through-hole, a portion of a glass fiber exposed from a resin coating at the end portion of the optical fiber F. The optical fiber F is, for example, a multicore fiber having multiple cores. The optical fiber F is attached to the ferrule 10 by inserting the optical fiber F into the rear end 13 of the ferrule body 11 and exposing the end face of the optical fiber F at the front end 12 of the ferrule body 11 such that the multiple cores are located at predetermined positions around the central axis of the ferrule 10. In the following, the X-axis is defined as parallel to the axis of the through-hole of the ferrule, and the direction in which the end of the optical fiber F is exposed is referred to as positive. The direction of the through-hole is also referred to as the optical axis direction of the optical fiber F.

A flange 14, such as a metal flange, is disposed outside a substantially central position of the ferrule body 11. For example, the flange 14 is substantially quadrangular in cross-section and has a top surface 15, a bottom surface 16 that is a flat surface, and side surfaces 17, forming the outer peripheral surface of the flange 14. The top surface 15 and the bottom surface 16 are faces opposing each other with the optical axis of the optical fiber F therebetween and parallel to each other at a predetermined distance in the Z-axis direction shown in the figure. Both side surfaces 17 are faces arranged in a direction orthogonal to the top surface 15 and the bottom surface 16 and parallel to each other at a predetermined distance in the Y-axis direction shown in the figure. The boundary positions between the top surface 15 and the side surfaces 17 and the boundary positions between the bottom surface 16 and the side surfaces 17 are chamfered. If the top surface 15 has a mark (not shown) serving as a reference for the rotational position, the ferrule 10 can be inserted into the plug frame 20 in the correct orientation.

Figure 3:
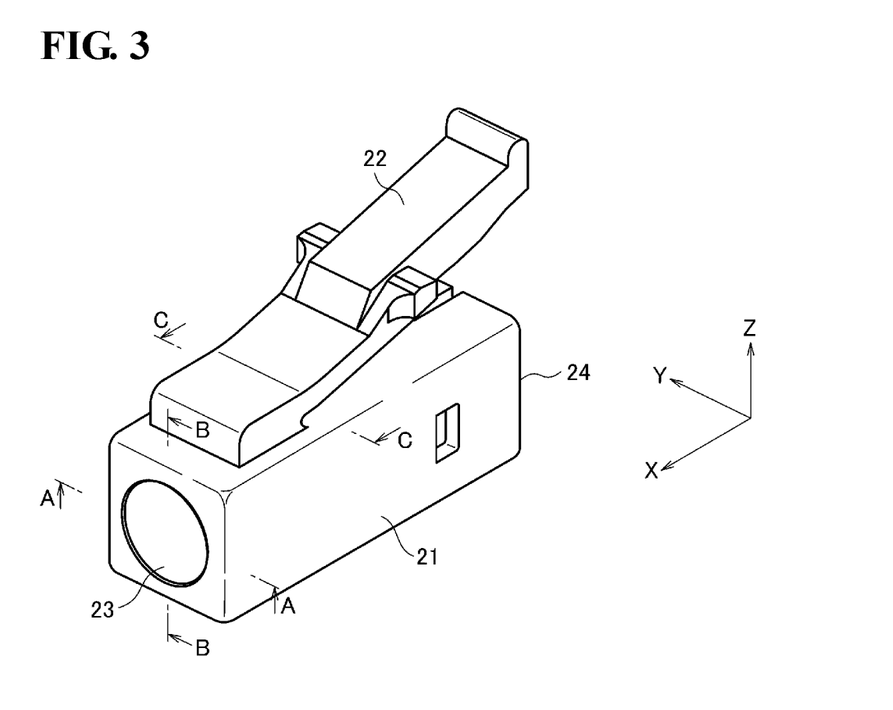
FIG. 3 is a perspective view of a front housing forming part of a plug frame forming the optical connector in FIG. 1.

FIG. 3 is a perspective view of a front housing 21 forming part of the plug frame 20. The front housing 21 has a square tubular shape extending in the X-axis direction and is formed of resin. The front housing 21 has a rear end opening 24 capable of receiving the ferrule 10 with the flange 14 and a front end opening 23 from which the front end 12 of the ferrule body 11 protrudes. A flexible latch arm 22 is disposed on the outer peripheral surface of the front housing 21.

Figure 4A:
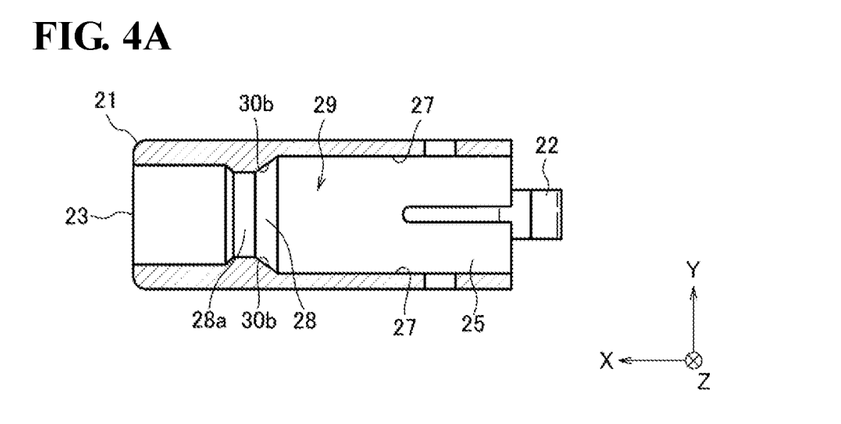
FIG. 4A is a sectional view of the front housing in FIG. 3 taken along line A-A as viewed in the direction of the arrows.
Figure 4B:
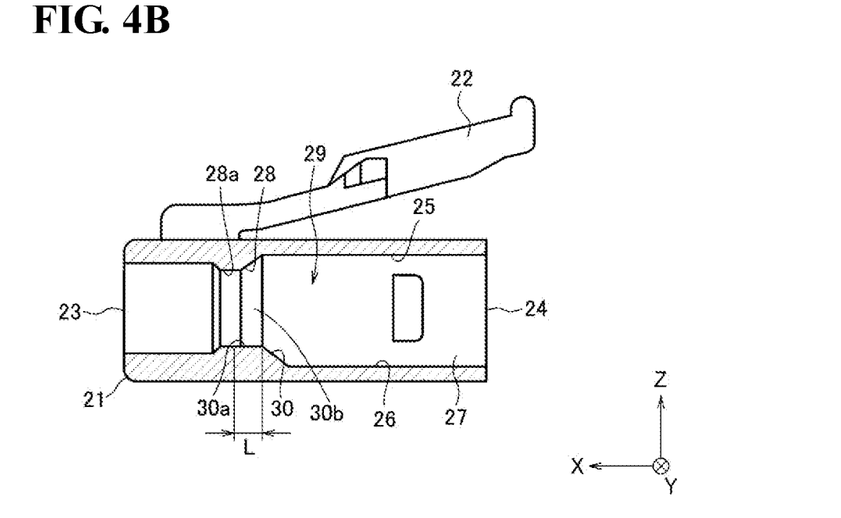
FIG. 4B is a sectional view of the front housing in FIG. 3 taken along line B-B as viewed in the direction of the arrows.
Figure 4C:
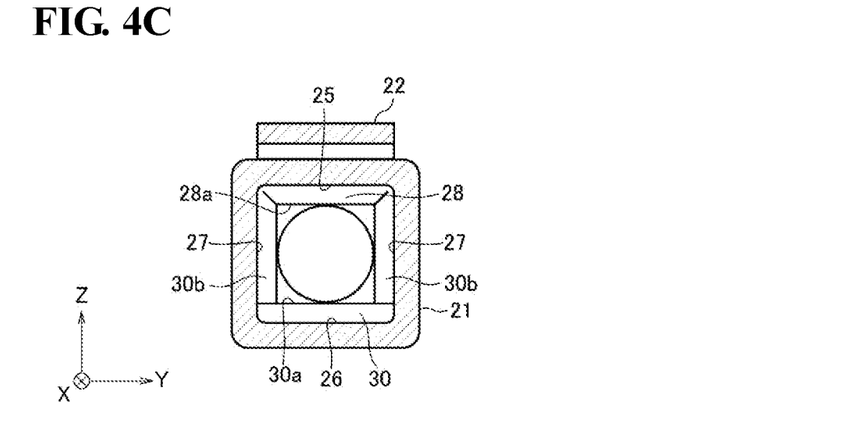
FIG. 4C is a sectional view of the front housing in FIG. 3 taken along line C-C as viewed in the direction of the arrows.

FIGS. 4A, 4B, and 4C are sectional views of the front housing 21 taken along lines A-A, B-B, and C-C, respectively, as viewed in the direction of the arrows. The front housing 21 has a top surface 25, a bottom surface 26, and side surfaces 27 inside the front housing 21. The top surface 25 and the bottom surface 26 are parallel to each other at a predetermined distance in the Z-axis direction shown in the figures. Both side surfaces 27 are parallel to each other at a predetermined distance in the Y-axis direction shown in the figures.

A tapered surface 28 is provided in the top surface 25 of the front housing 21 such that the inner space becomes gradually narrower in the positive direction of the X-axis. A flat fitting surface 28a extending in the optical axis direction is provided on the opening 23 side (front side) of the tapered surface 28. A guide surface 30a is provided in the bottom surface 26 of the front housing 21 at a position opposite the tapered surface 28. The guide surface 30a is a face provided at a position higher than the bottom surface 26 by one step and extending in the optical axis direction. Thus, the height of the inner space of the front housing 21 becomes gradually shorter forward, which facilitates insertion of the ferrule 10 from the rear side of the front housing 21. As the ferrule 10 advances further, the gap between the outer peripheral surface of the flange 14 and the inner peripheral surface of the front housing 21 becomes smaller, which facilitates alignment of the ferrule 10 relative to the front housing 21.

Tapered surfaces 30b are also provided in the side surfaces 27 of the front housing 21 such that the width between the side surfaces 27 becomes gradually narrower in the positive direction of the X-axis. A tapered surface 30 is provided in the bottom surface 26 of the front housing 21 on the opening 24 side (rear side) of the guide surface 30a such that the tapered surface 30 rises gradually in the positive direction of the X-axis. These features also contribute to ease of insertion of the ferrule 10.

On the other hand, the length of the guide surface 30a in the X-axis direction (indicated by L in FIG. 4B) is shorter than the amount of travel of the flange 14 in the X-axis direction during connector connection, described later, and there is a clearance 29 with which the flange 14 does not engage on the rear side of the guide surface 30a (in the negative direction of the X-axis). The clearance 29 is a square tubular inner space defined by the top surface 25, the bottom surface 26, and the side surfaces 27. The distance between the top surface 25 and the bottom surface 26 (the length in the Z-axis direction shown in the figures) is longer than the thickness of the flange 14. The ferrule 10 with the flange 14 is allowed to float when the flange 14 is located within the clearance 29.

Figure 5:
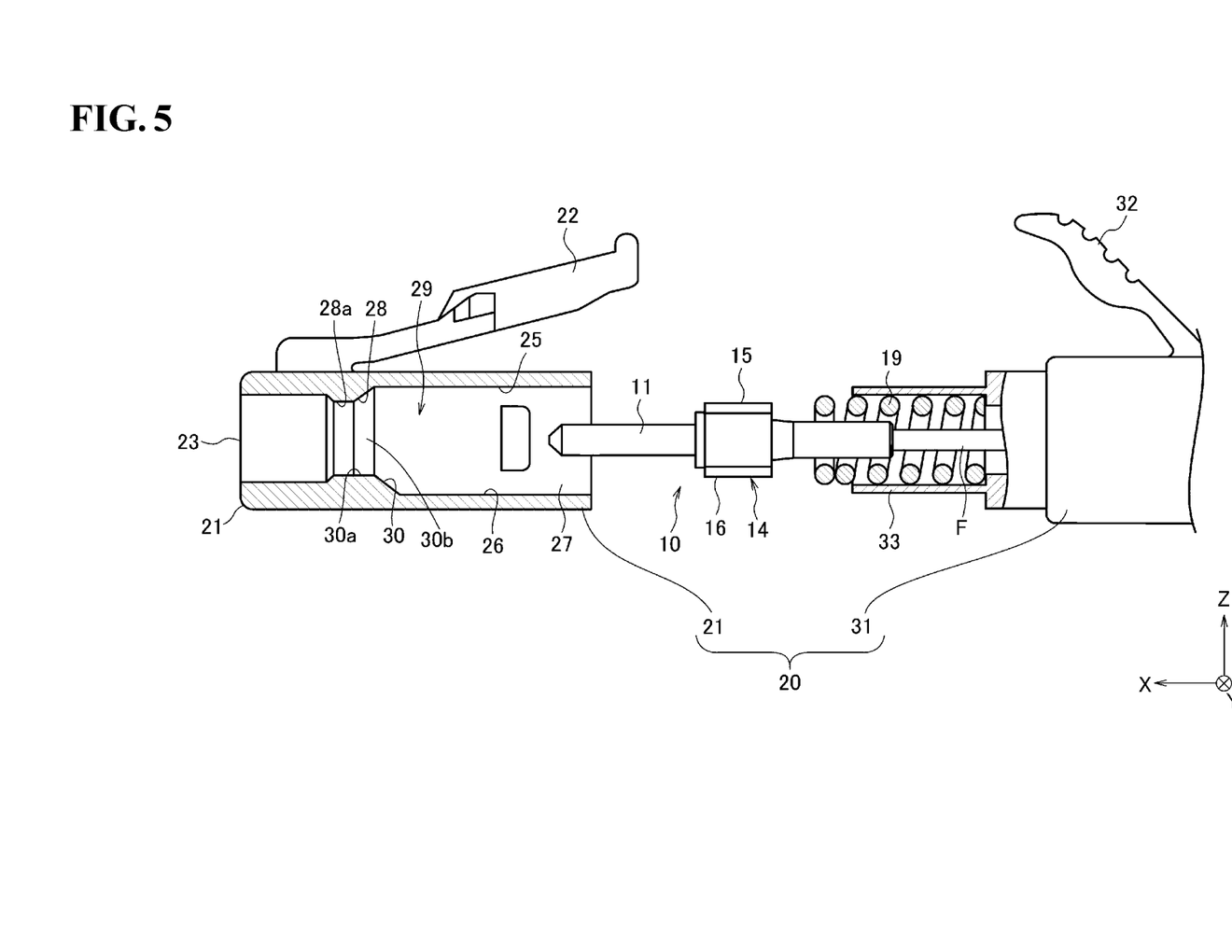
FIG. 5 is a sectional view showing the state of the optical connector in FIG. 1 before the accommodation of the ferrule into the plug frame.

FIG. 5 is a sectional view showing the state before the accommodation of the ferrule 10 into the plug frame 20. The plug frame 20 has a rear housing 31 on the rear side of the front housing 21. The rear housing 31 is formed of, for example, resin. The rear housing 31 has a cylindrical spring-accommodating part 33 capable of accommodating the rear end portion of the ferrule 10 and a coil spring 19 serving as an elastic member. The coil spring 19 is disposed on the rear side of the ferrule 10 and is brought into abutment with the rear end of the flange 14 to bias the ferrule 10 forward (in the positive direction of the X-axis).

A clip 32 capable of engaging with the latch arm 22 is disposed on the outer peripheral surface of the rear housing 31. The rear end portion of the ferrule 10 and the coil spring 19 are accommodated into the rear housing 31, whereas the front-end portion of the ferrule 10 is inserted into the front housing 21. The front housing 21 and the rear housing 31 are positioned opposite each other, and as the clip 32 is moved onto the latch arm 22, the front housing 21 is latched to the rear housing 31. At the same time, the flange 14 is pushed forward by the biasing force of the coil spring 19, and the bottom surface 16 of the flange 14 is moved forward along the tapered surface 30 of the front housing 21 onto the guide surface 30a of the front housing 21. By bringing the bottom surface 16 of the flange 14 into contact with the guide surface 30a of the front housing 21, the flange 14 and the front housing 21 are held so as to be unrotatable relative to each other, and the flange 14 and the front housing 21 are aligned relative to each other in the rotational direction.

Figure 6:
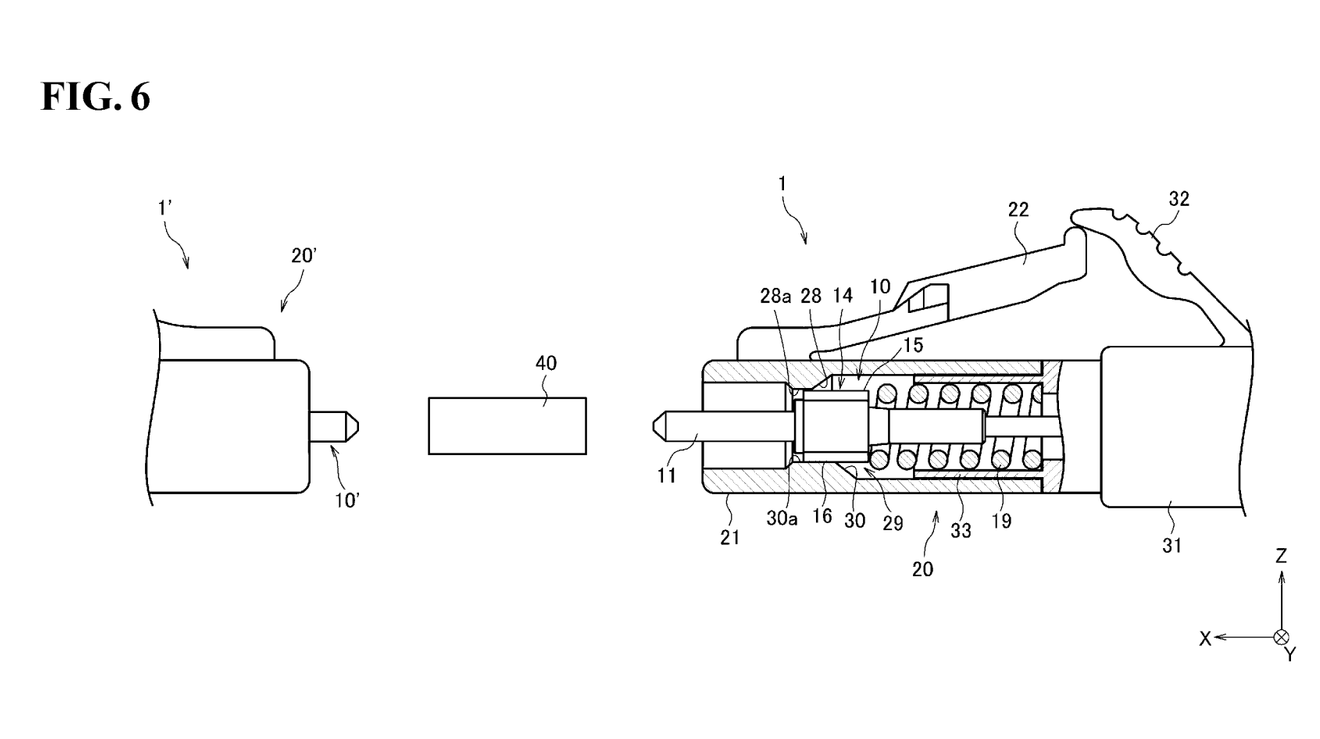
FIG. 6 is a sectional view showing the state of the optical connector in FIG. 1 after the accommodation of the ferrule into the plug frame, together with a split sleeve.

FIG. 6 is a sectional view showing the state after the accommodation of the ferrule 10 into the plug frame 20, together with a split sleeve 40. The flange 14 is moved forward along the tapered surfaces 28 and 30b of the front housing 21 while the bottom surface 16 thereof is in contact with the guide surface 30a. For example, when the top surface 15 of the flange 14 comes into contact with the fitting surface 28a of the front housing 21, the ferrule 10 is aligned at a position where the end portion thereof protrudes from the front housing 21. The ferrule 10 is no longer movable in any of the X-axis, Y-axis, and Z-axis directions and is also no longer rotatable about the optical axis.

The split sleeve 40 has an inner diameter substantially equal to, or slightly smaller than, the diameter of the ferrules 10 and 10'. The split sleeve 40 also has a slit (not shown) that can be widened to increase the inner diameter thereof. The split sleeve 40 may also be incorporated into an adaptor serving as a component for connecting together connectors of the same or different types.

Figure 7:
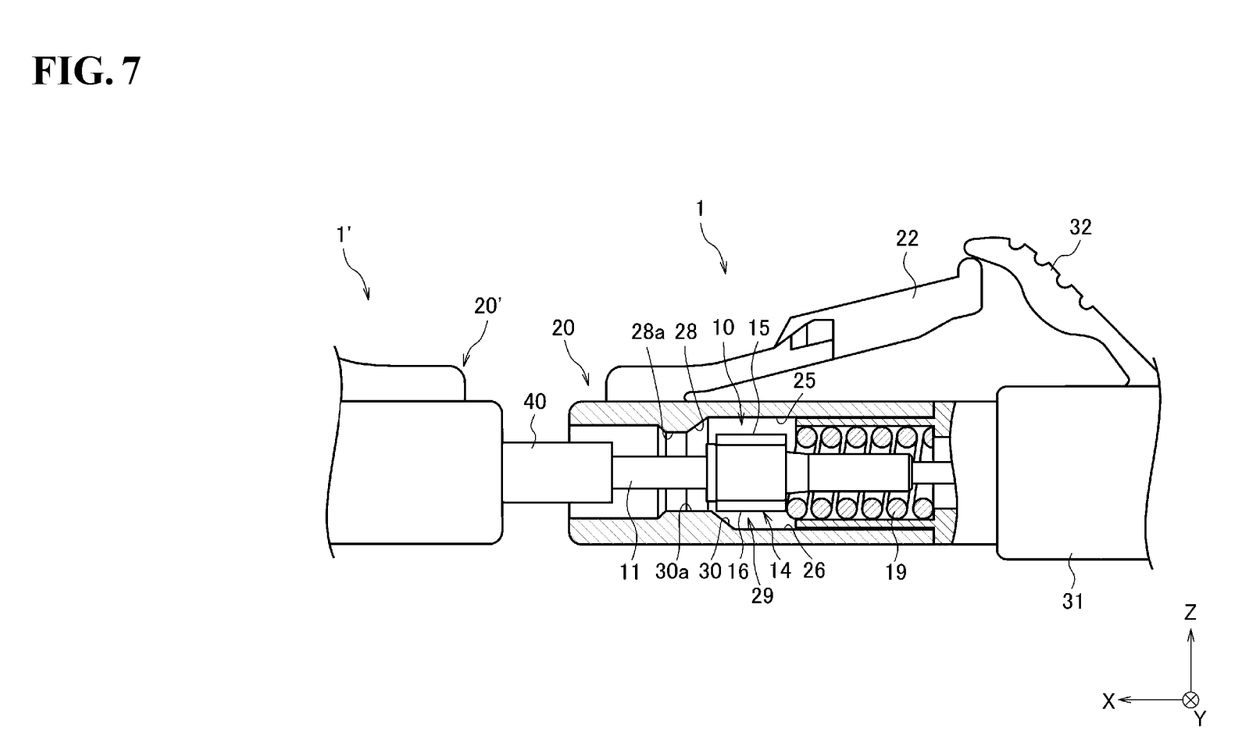
FIG. 7 is a sectional view showing the state of the optical connector in FIG. 1 after connection to another optical connector with the split sleeve therebetween.

FIG. 7 is a sectional view showing an optical connection structure in which the optical connector 1 is connected to another optical connector with the split sleeve 40 therebetween. The optical connection structure includes the optical connector 1 and another optical connector 1'. The split sleeve 40 is used to optically connect the optical fiber F on the optical connector 1 side to an optical fiber F' (not shown) on the optical connector 1' side. The optical fiber F' is also a multicore fiber having multiple cores. The optical fiber F' is attached to a ferrule 10' such that the multiple cores are located at predetermined positions around the central axis of the ferrule 10'. Although not shown in cross-section, the optical connector 1' is configured in the same manner as the optical connector 1 and includes a plug frame 20' accommodating the ferrule 10' holding the optical fiber F' and an elastic member (not shown) biasing the ferrule 10'.

The ferrule 10 is inserted into one end of the split sleeve 40, whereas the ferrule 10' is inserted into the other end of the split sleeve 40. The end face of the optical fiber F on the ferrule 10 side and the end face of the optical fiber F' on the ferrule 10' side are brought into surface contact with each other in the split sleeve 40 (also referred to as "connector connection"). As the split sleeve 40 enters the front housing 21 and the ferrule 10 is moved rearward, the flange 14 is moved rearward against the biasing force of the coil spring 19, with the result that the top surface 15 of the flange 14 is separated from the fitting surface 28a of the front housing 21. As the ferrule 10 is further moved rearward, the bottom surface 16 of the flange 14 is separated from the guide surface 30a of the front housing 21.

When the flange 14 reaches the clearance 29, the ferrule 10 is brought into a floating state relative to the front housing 21. The ferrule 10 is movable in any of the X-axis, Y-axis, and Z-axis directions and is also rotatable about the optical axis together with the optical fiber F' on the optical connector 1' side.

Thus, the top surface 15 and bottom surface 16 of the flange 14 remain in contact with the fitting surface 28a and guide surface 30a of the front housing 21 until the optical connector 1 is coupled to the connection target, i.e., the optical connector 1' (until the ferrule 10 is moved from the front side to the rear side), which allows the ferrule 10 to be aligned relative to the front housing 21 and also prevents rotation. Thus, when the plug frame 20 is opposed to the plug frame 20', the multiple cores included in the optical fiber F can be accurately opposed to the multiple cores included in the optical fiber F'.

On the other hand, after the optical connector 1 is coupled to the optical connector 1' (after the ferrule 10 is moved to the rear side, i.e., upon connector connection), the top surface 15 and bottom surface 16 of the flange 14 are separated from the fitting surface 28a and guide surface 30a of the front housing 21 to allow the ferrule 10 to float relative to the front housing 21. When an external force is applied to the front housing 21 or the rear housing 31, the external force is not transmitted to the ferrule 10, so that the optical connection between the two optical fibers F and F' can be maintained.

Thus, an aligned state and a floating state are achieved simply by providing the top surface 15 and bottom surface 16 of the flange 14 and the fitting surface 28a and guide surface 30a of the front housing 21, and the optical connector 1 requires fewer components and also has a simpler structure. As a result, an optical connection structure in which an optical connection can be easily maintained with a simple structure can be provided.

In the foregoing embodiment, an example in which the top surface 15 and bottom surface 16 of the flange 14 are held between the fitting surface 28a and guide surface 30a of the front housing 21 when the bottom surface 16 of the flange 14 is in contact with the guide surface 30a of the front housing 21 has been described. In this case, the flange can be easily aligned by the tapered surface and the guide surface. However, the present invention is not limited to this example. Rather, the fitting surface 28a of the front housing 21 may be omitted. Specifically, for example, the tapered surface 28 can be set to a steeper angle so that the top surface 15 and bottom surface 16 of the flange 14 are held between the tapered surface 28 and guide surface 30a of the front housing 21.

In addition, the present invention can be applied to other types of optical connectors, including, for example, SC connectors and MU connectors. Furthermore, the optical fiber of the present invention may also be, for example, a single-mode fiber, a polarization-maintaining fiber, or a fiber bundle. Of these, multicore fibers, polarization-maintaining fibers, and fiber bundles are optical fibers that require the adjustment of the angle of rotation about the central axis when optically connected.

Although not shown, a polarization-maintaining fiber (e.g., a stress-applied polarization-maintaining fiber) has circular stress-applying parts arranged on both sides of a core. Whereas a single-mode fiber has two modes with orthogonal planes of polarization (polarization modes), a polarization-maintaining fiber creates a difference in propagation constant between these two polarization modes to reduce the coupling of one polarization mode to the other polarization mode, thereby achieving an enhanced polarization-maintaining ability.

Figure 8:
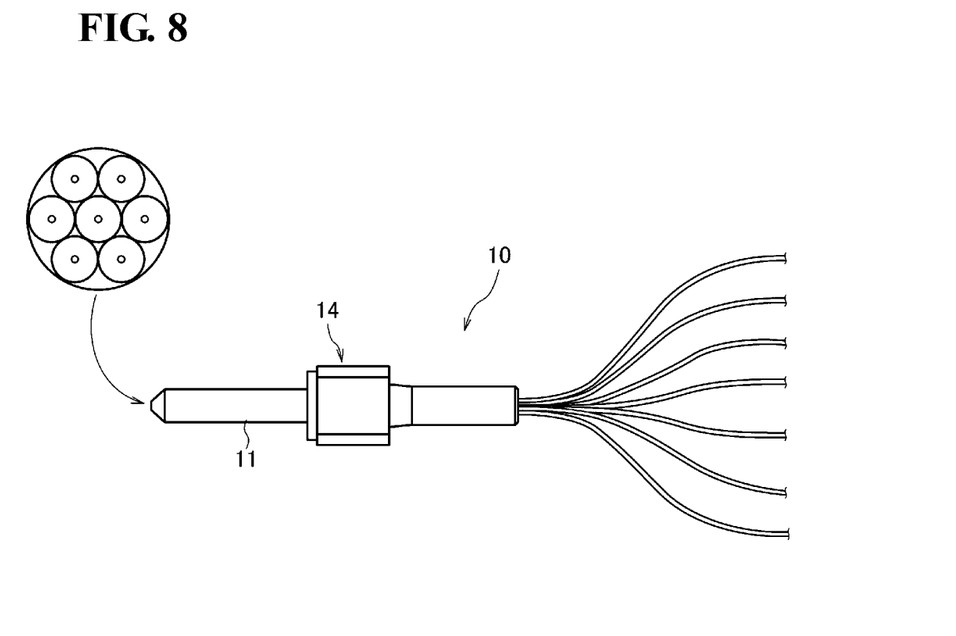
FIG. 8 is a conceptual diagram illustrating a ferrule equipped with a fiber bundle.

A fiber bundle is a bundle of single-core fibers for optical connection to a multicore fiber. Specifically, for example, ends of singlecore fibers with a glass diameter of 125 μm are chemically etched to a glass diameter of, for example, 45 μm. As shown in FIG. 8, a plurality of (e.g., seven) fibers thus prepared are bundled together with an adhesive and are inserted into the ferrule 10. In this example, the fibers can be arranged such that the core-to-core distance is 45 μm. Thus, it is possible to reliably align not only single-mode fibers, but also multicore fibers, polarization-maintaining fibers, and fiber bundles, thereby preventing an increase in connection loss.

In the foregoing embodiment, an example in which the flange 14 is substantially quadrangular in cross-section for ease of manufacture has been described. However, the flange of the present invention need not be axisymmetric in cross-section, but may be, for example, D-shaped or triangular in cross-section or may have a shape with a protrusion serving as a key.

Figure 9A:
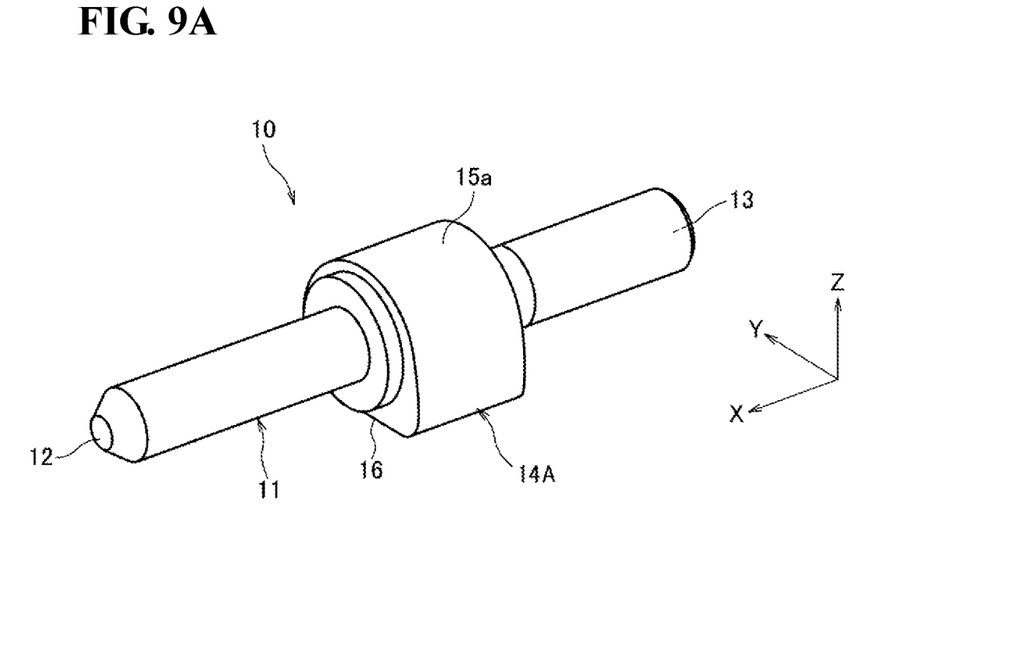
FIG. 9A is a perspective view of a ferrule according to another embodiment.

FIG. 9A shows an example of a ferrule including a flange 14A that is D-shaped in cross-section. The flange 14A has a flat bottom surface 16 and a curved surface 15a located above the bottom surface 16.

Figure 9B:
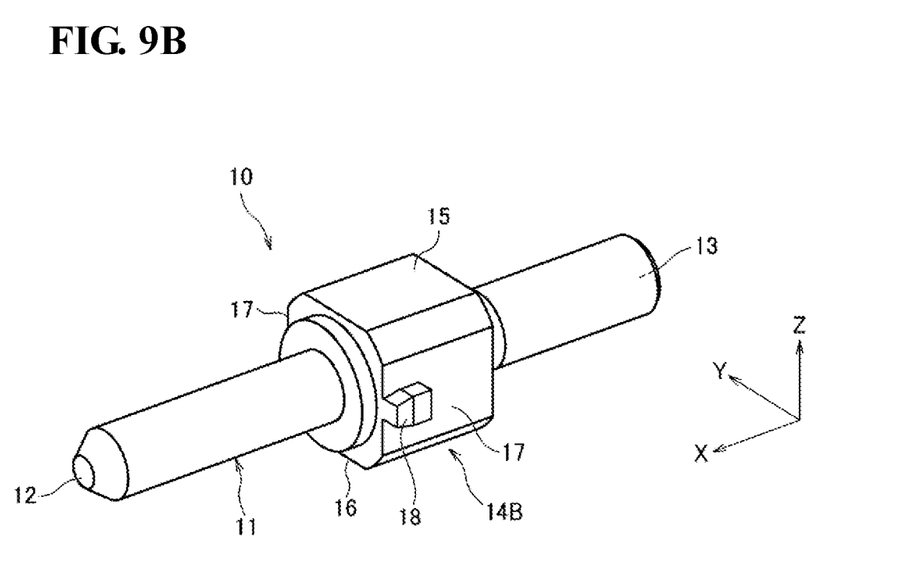
FIG. 9B is a perspective view of a ferrule according to another embodiment.

FIG. 9B shows an example of a ferrule including a flange 14B having a key protrusion 18. The flange 14B has the key protrusion 18 on the front-end portion of a side surface 17 different from a bottom surface 16 that is a flat surface. The key protrusion 18 is substantially quadrangular in a cross-section perpendicular to the central axis of the ferrule. In this example, the front housing 21 has a keyway parallel to the biasing direction of the coil spring 19, and the key protrusion 18 slides in the keyway.

Thus, if the flange 14 has a shape that is not axisymmetric in cross-section, the ferrule 10 can be inserted into the plug frame 20 in the correct orientation without a mark serving as a reference for the rotational position, which facilitates alignment of the ferrule 10 relative to the plug frame 20 in the rotational direction.

Although an example in which the front housing 21 has the tapered surfaces 28 and 30b has been described, the flange 14 may have tapered surfaces in the front portions of the top surface 15, the bottom surface 16, and the side surfaces 17 in the optical axis direction so as to become gradually thinner forward in the optical axis direction. If the height and width of the flange 14 become gradually shorter forward, the ferrule 10 can be easily inserted from the rear side of the plug frame 20. As the ferrule 10 advances further, the gap between the flange 14 and the plug frame 20 becomes smaller, which facilitates alignment of the ferrule 10 relative to the plug frame 20. If the flange 14 is thinner on the front side thereof in this way, the front housing may have the tapered surfaces 28 and 30b such that the inner space becomes narrower, as in the foregoing embodiment, or may have flat surfaces instead of the tapered surfaces 28 and 30b.

The embodiments disclosed herein are to be considered in all respects as illustrative and not restrictive. The scope of the invention is indicated by the claims, rather than by the foregoing meaning, and all changes that come within the meaning and range of equivalency of the claims are intended to be embraced therein.

REFERENCE SIGNS LIST 1, 1' . . . optical connector, 10, 10' . . . ferrule, 11 . . . ferrule body, 12 . . . front end, 13 . . . rear end, 14 . . . flange, 15 . . . top surface, 15a . . . curved surface, 16 . . . bottom surface, 17 . . . side surface, 18 . . . key protrusion, 19 . . . coil spring, 20, 20' . . . plug frame, 21 . . . front housing, 22 . . . latch arm, 23 . . . front end opening, 24 . . . rear end opening, 25 . . . top surface, 26 . . . bottom surface, 27 . . . side surface, 28 . . . tapered surface, 28a . . . fitting surface, 29 . . . clearance, 30, 30b . . . tapered surface, 30a . . . guide surface, 31 . . . rear housing, 32 . . . clip, 33 . . . spring-accommodating part, 34 . . . boot, 40 . . . split sleeve.

The invention claimed is:

1. An optical connector comprising:
an optical fiber including a glass fiber and a resin coating surrounding the glass fiber;
a ferrule having a flange located outside the ferrule and a through-hole located inside the ferrule, the ferrule holding, in the through-hole, a portion of the glass fiber exposed from the resin coating at an end of the optical fiber, the flange having a flat surface on an outer periphery of the flange, which is a face parallel to an axis of the through-hole;
a plug frame accommodating the ferrule; and
an elastic member abutting the flange and biasing the ferrule forward in a direction of the axis of the through-hole, the plug frame having a guide surface configured to unrotatably align the ferrule biased by the elastic member at a predetermined position in contact with the flat surface of the flange, the guide surface being a face in an inner peripheral surface of the plug frame and parallel to a biasing direction of the elastic member, wherein:
the plug frame has a tapered surface in the inner peripheral surface of the plug frame at a position opposite to the guide surface such that an inner space becomes gradually narrower forward in the direction of the axis of the through-hole,
the flange is held between the tapered surface and the guide surface when the flat surface is in contact with the guide surface at the predetermined position, and
when the ferrule is moved rearward in the direction of the axis of the through-hole relative to the predetermined position, the flat surface is separated from the guide surface to bring the ferrule into a floating state relative to the plug frame.

2. The optical connector according to claim 1, wherein the ferrule includes zirconia.

3. An optical connection structure comprising:
the optical connector according to claim 1; and
a connection target coupled to the optical connector with a sleeve located therebetween, the optical fiber and another optical fiber being optically connected together,
wherein the flat surface of the flange is separated from the guide surface when the ferrule is inserted into the sleeve and is moved rearward in the direction of the axis of the through-hole relative to the predetermined position of the plug frame.

4. The optical connector according to claim 1, wherein the flange has a tapered surface in a front portion of the flat surface in the direction of the axis of the through-hole so as to become gradually thinner forward in the direction of the axis of the through-hole.

5. The optical connector according to claim 1, wherein the flange has a quadrangular shape in a cross-section.

6. The optical connector according to claim 1, wherein the flange is not axisymmetric in a cross-section.

7. The optical connector according to claim 6, wherein the flange is D-shaped in a cross-section.

8. The optical connector according to claim 6, wherein the flange has a key protrusion on a surface different from the flat surface, and the plug frame has a keyway in which the key protrusion slides in an inner peripheral surface of the keyway.

9. The optical connector according to claim 1, wherein the optical fiber is a single-mode fiber, a multicore fiber, a polarization-maintaining fiber, or a fiber bundle.

* * * * *